(12) United States Patent
Pearson

(10) Patent No.: US 6,839,645 B2
(45) Date of Patent: Jan. 4, 2005

(54) METHOD AND APPARATUS TO PERFORM POLY-PHASE INSTRUMENTATION WITH SINGLE-PHASE INSTRUMENTS

(75) Inventor: William Robert Pearson, Salem, VA (US)

(73) Assignee: General Electric Company, Schenectady, NY (US)

(*) Notice: Subject to any disclaimer, the term of this patent is extended or adjusted under 35 U.S.C. 154(b) by 275 days.

(21) Appl. No.: 10/063,382

(22) Filed: Apr. 17, 2002

(65) Prior Publication Data

US 2003/0201744 A1 Oct. 30, 2003

(51) Int. Cl.[7] ............................................. H02P 1/04
(52) U.S. Cl. ................................................... 702/84
(58) Field of Search .......................... 702/84; 330/52; 714/6; 331/10; 398/213; 327/156, 113; 318/432, 800; 380/238; 332/170; 405/205; 455/260, 205, 341; 375/344, 130

(56) References Cited

U.S. PATENT DOCUMENTS

| 4,635,004 A | * | 1/1987 | Ishigaki ...................... 332/170 |
| 5,648,736 A | * | 7/1997 | Ishigaki ...................... 327/113 |
| 6,104,745 A | * | 8/2000 | Koh ............................. 375/130 |
| 6,236,848 B1 | * | 5/2001 | Igarashi et al. ............. 455/341 |

* cited by examiner

Primary Examiner—John Barlow
Assistant Examiner—Tung S Lau
(74) Attorney, Agent, or Firm—Cantor Colburn LLP

(57) ABSTRACT

A method and apparatus for generating a poly phase signal set from a single signal output of a single phase instrument. The method comprising: generating a first signal output X representing the single signal output; processing the single signal output to generate a time delayed version Y_Raw of the single signal output by a time delay T; and processing the time delayed version Y_Raw to compensate for frequency changes in the single signal output and generating a second signal output Y of the poly phase signal set. The second signal output Y is displaced from the first signal output X by about 90 degrees.

21 Claims, 5 Drawing Sheets

(P# PTCT_Type=0
Reference phasor set
given Vab,Vbc,Ia,Ic

Valpha= (2/SQTR3)*Vab+(1/SQRT3)*Vbc
Vbeta= Vbc (P# PTCT_Type=1

Transformation given Vab,Vbc,Ib
Voltage same as reference set

Ialpha = Ia
Ibeta = -(1/SQRT3)*Ia -(2/SQRT3)*Ic

Ialpha = -Iy*cos(30) -Ix*sin(30)
Ibeta = Iy*cos(30) -Iy*sin(30)

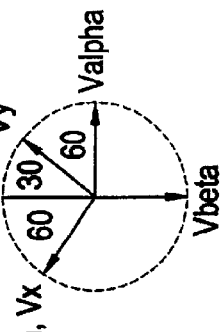
FIG. 7
(P# PTCT_Type=2)
Transformation given Vab,Ic
Valpha = Vx* cos(30) + Vy*sin(30)
Vbeta = Vy* cos(30) + Vx*sin(30)
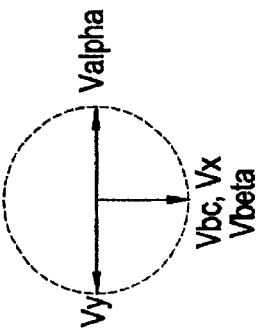
FIG. 9
(P# PTCT_Type=3)
Transformation given Vbc,Ia
Valpha =Vy
Vbeta =Vx
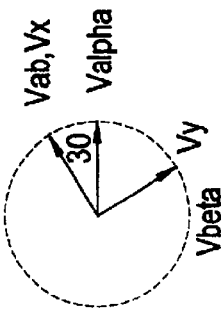
FIG. 11
(P# PTCT_Type=4)
Transformation given Vca,Ib
Valpha = Vx* cos(30) + Vy*sin(30)
Vbeta = Vy* cos(30) + Vx*sin(30)
FIG. 8
Ialpha = Iy* cos(30) - Ix*sin(30)
Ibeta = Ix* cos(30) - Iy*sin(30)
FIG. 10
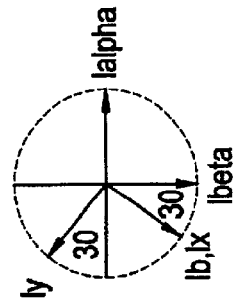
FIG. 12
Ialpha = Iy* cos(30) - Ix*sin(30)
Ibeta = Ix* cos(30) - Iy*sin(30)
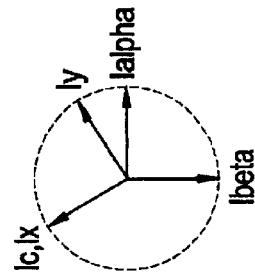

METHOD AND APPARATUS TO PERFORM POLY-PHASE INSTRUMENTATION WITH SINGLE-PHASE INSTRUMENTS

BACKGROUND OF INVENTION

The complex, dynamic behavior of gas and steam turbines requires a flexible control system that provides state-of-the-art control, monitoring, and protection functions.

More specifically, in generator control, it is necessary to measure generator stator voltages and currents (typically sinusoidal signals) and subsequently use this information to calculate voltage magnitude, current magnitude, real power, frequency, and slip to synchronize the generator. It is well known that balanced poly-phase systems (such as 3-phase systems common to generators) with poly-phase instrumentation can transducer ac signals to dc without any inherent time delay or resulting ripple (ac components). Although in practice, some filtering is typically necessary. The same is not inherently possible for single phase instrument measurements. Although the generator is 3 phase, for economic reasons, only single phase instruments (such as a single potential transformer (PT) or a current transformer (CT)) or mixed transducering (such as a three phase PT and a single phase CT set) may actually be installed on the generator.

Thus there is a need for an apparatus and method capable of using single phase measurements or a combination of single phase and three phase measurements to form a poly phase signal set to calculate the voltage magnitude, current magnitude, frequency and slip using poly-phase instrumentation downstream (e.g., a calculation suite).

SUMMARY OF INVENTION

The above discussed and other drawbacks and deficiencies are overcome or alleviated by a method and apparatus for generating a poly phase signal set from a single signal output of a single phase instrument. The method comprising: generating a first signal output X representing the single signal output; processing the single signal output to generate a time delayed version Y_Raw of the single signal output by a time delay T; and processing the time delayed version Y_Raw to compensate for frequency changes in the single signal output and generating a second signal output Y of the poly phase signal set. The second signal output Y is displaced from the first signal output X by about 90 degrees.

In another aspect of the disclosure, a device for performing poly phase instrumentation for generator control using a single signal output of a single phase instrument is described. The device includes an I/O device configured to receive a first signal and generate the first signal as a first output; a multiplier connected to receive the first signal and generate a multiplied cosine value signal of the first signal; and a digital delay connected to receive the first signal. The digital delay delays the first signal to generate a delayed signal while a summer is connected to receive both the multiplied delayed signals. The summer generates a summation signal and a divider is connected to receive the summation signal and a sin value signal to perform a division of the summation signal and the sin value signal to generate a second output. The first and second outputs represent two different phase signals.

BRIEF DESCRIPTION OF DRAWINGS

Referring now to the drawings wherein like elements are numbered alike in the several Figures:

FIG. 7 shows a given transformation of Vab=−Vx from a single phase PT and a derived Vy from Vx;

FIG. 8 shows a given transformation of Ic=Ix from a single phase CT and a derived Iy from Ix;

FIG. 9 shows a given transformation of Vbc=Vx from a single phase PT and a derived Vy from Vx;

FIG. 10 shows a given transformation of Ia=Ix from a single phase CT and a derived Iy from Ix;

FIG. 11 shows a given transformation of Vca=Vx from a single phase PT and a derived Vy from Vx;

FIG. 12 shows a given transformation of Ib=Ix from a single phase CT and a derived Iy from Ix.

DETAILED DESCRIPTION

Figure 1:
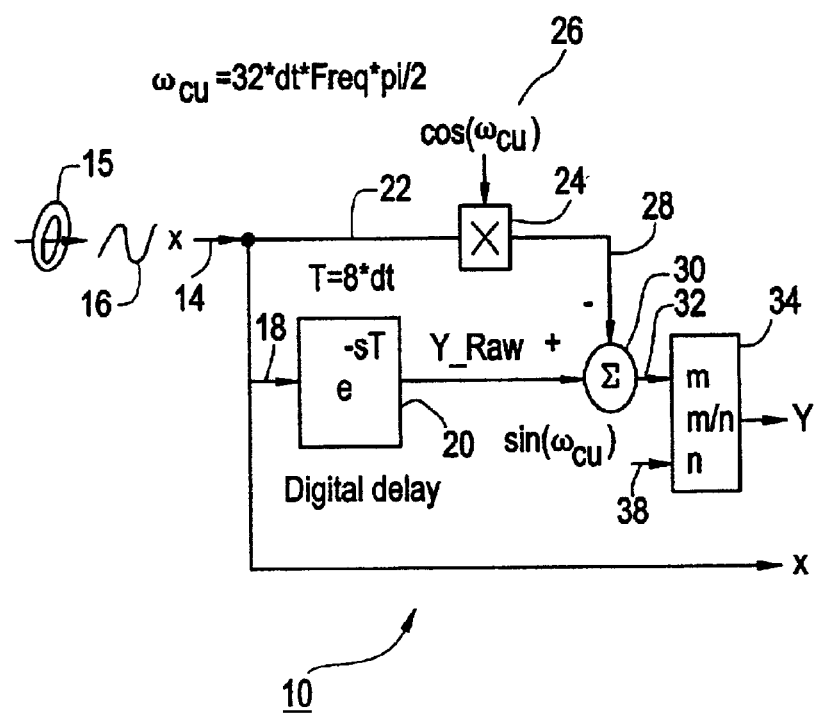
FIG. 1 is one implementation of an algorithm for converting a single phase signal input (X) to a poly phase output (X and Y)

Referring now to FIG. 1, one implementation is exemplified for generating a poly phase signal set from a single signal output of a single-phase instrument. A device 10 is connected to receive a single input 14 from a single phase measurement instrument 15. Single phase instrument 15 includes, but is not limited to, a single phase potential transformer (PT) or a current transformer (CT) connected to a single phase of a generator (not shown). The single phase instrument 15 provides a sinusoidal signal 16 to single output 14 indicating voltage or current of the single phase that single phase instrument 15 is in electrical communication with. Sinusoidal signal 16 is a sinusoidal voltage signal when a PT is used and a sinusoidal current signal when a CT is used. Sinusoidal signal 16 is processed by device 10 and generates a first signal X and a second signal Y as outputs from device 10 to be used in downstream poly phase instrumentation to calculate voltage, current, power magnitudes, and the like. Signals X and Y are offset in electrical phase from each other by approximately 90 degrees. Based on the input signal X, the device 10 generates a poly phase signal set which can be used by a downstream device, such as a phase lock loop PLL and/or filters to eliminate any inherent time delay or resulting ac ripple that is common with poly phase instrumentation when transducering ac signals to dc.

The signal X is processed in two separate, parallel paths. In one path 18, signal X is supplied as an input to a digital delay 20, which delays signal X by a factor of $e^{-sT}$ (where s is the Laplace operator) and T represents the delay in seconds. Signal Y_Raw is an output of digital delay 20 and is a derived version of signal input X delayed in time by T seconds. It is desirable to select T close to 0.25 times the nominal period of signal X. For generator applications this would typically be either 1/50 or 1/60 seconds. Due to the selection of the computer sampling time dt to some desirable value and the constraint that only on integer number of samples is possible one chooses a value of T/dt samples rounded to the closest integer. For example, the General Electric EX2100 product selected dt=0.5 ms or 500 $\mu$s (discussed later herein) and T=1/60/4 seconds which gives T/dt=8.333. Thus 8 was chosen as the closest integer value and is shown as part of T=8*dt equation in the above diagram.

In another path 22, signal X is supplied to a multiplier 24 along with a cosine ($\omega_{cu}$) 26, which produces a multiplier output 28. The multiplied signal 28 and delayed signal Y_Raw from the first and second paths 22, 18, respectively, are provided as inputs to a summer 30, which arithmetically sums the signals to generate a summed output 32. The summed output then is provided to divider 34 which divides the summed output 32 by a factor of sin ($\omega_{cu}$) 38. This factor of 2 pi only implies a scaling from Hertz to radians per second. The divided summed signal is provided as an output Y of the divider 34. Signal Y represents signal X with a phase shift of 90 degrees, thus signals X and Y providing a balanced poly phase signal set to be used downstream by a calculation suite to determine voltage and current magnitudes from stator voltages and currents measured with a single phase transformers.

In order to create the signal Y to be exactly 90 degrees displaced from signal X and also be of the same amplitude it is necessary to produce further compensations based on the frequency of X. Mathematically this can be done as follows: Y=(Y_Raw−cos (wcu))/sin(wcu) where wcu= 32*dt*Freq*pi/2 r/s and Freq=frequency of X Hz.

As seen above it is necessary to measure the frequency of X. This can now be conveniently done with a 2-phase phase lock loop (PLL) which is known in the art for a poly-phase instrumentation set. This set can use the newly created X and Y signals.

As discussed above, Y_Raw is a time delayed version of X (as shown in Laplace form exp(−sT)). The ideal "wcu" is pi/2 (yielding sin(wcu)=1 and cos(wcu)=0) for a nominal operating frequency of X. For example, if Freq=60 Hz and dt=1/(32*60)=520.833 $\mu$s wcu=(32*520.833e-06*60)*pi/2= pi/2. Since 520.833 $\mu$s is inconvenient in practice, it is preferable to use dt=500 $\mu$s, and as such for a nominal 60 Hz conditions, sin(wcu=0.96*pi/2)=0.998≈1, and cos(wcu)= 0.0628≈0. Thus, for nominal conditions, the signal 28 does not provide a contribution nor does the divider 34.

Figure 2:
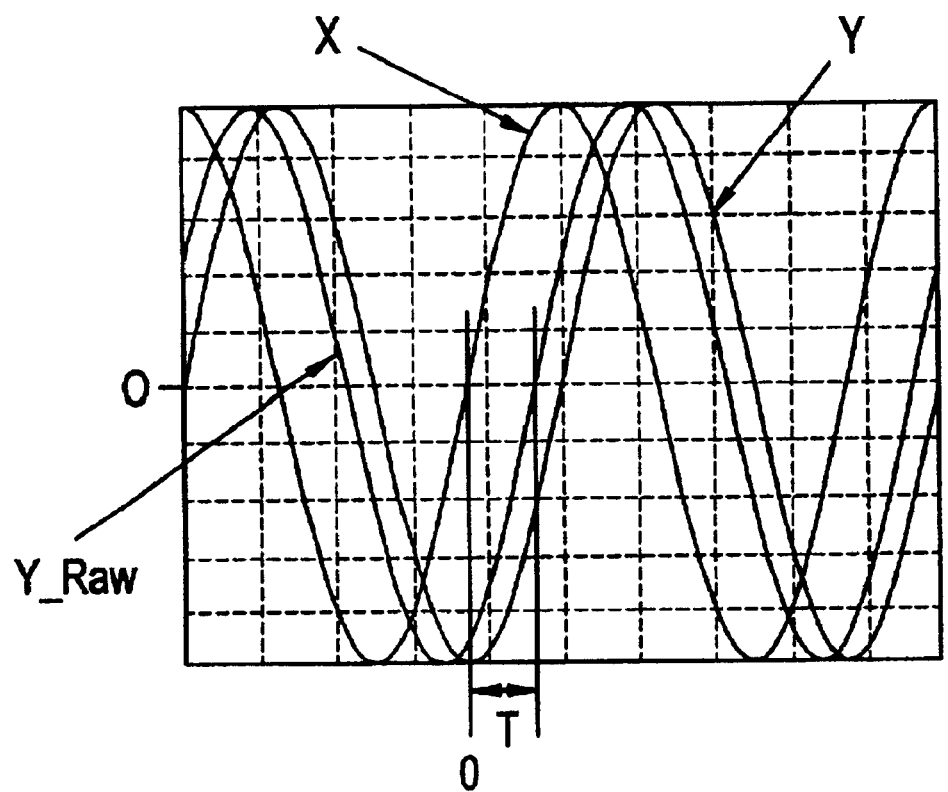
FIG. 2 is a graphical depiction of the voltage phase characteristics of the input and output single phase signal (X), the intermediate processed signal X (Y_Raw), and the output signal (Y) of FIG. 1.

Referring now to FIG. 2, a graphical depiction of the input, intermediary and output signal characteristics of device 10 in FIG. 1 is shown. The signal X is the original input signal from a single phase potential/current transformer that is input to device 10, and is sinusoidal in nature. Intermediary signal Y_Raw replicates signal X with a phase change or delay time of "T" seconds. As discussed above, in one embodiment using the method and device 10 with a General Electric exciter EX2100, the computer sampling time selected is dt=0.5 ms, coupled with a constraint that only an integer number of samples/cycles is possible, then T=8*dt because T/dt=8.333. Y_Raw is offset from signal X by a delay time of T seconds, however, it can be seen that at time 0 when signal X is zero, signal Y_Raw is not 0 when signal X is at a peak amplitude representing that signals X and Y_Raw are out of phase by 90 degrees. The desired offset delay characteristic of signal X is also depicted in FIG. 2. Signal Y is 90 degrees phase delayed from signal X. When signal X is 0, Signal Y is also zero when signal X is at a peak amplitude defining a 90 degree out of phase relationship. In order to create signal Y to be 90 degrees displaced from signal X and also be the same amplitude to create a poly phase signal set, further compensation based on the frequency of signal X are performed as discussed above.

According to the above described embodiment, the frequency of X must be measured to perform the compensations on Y_Raw to produce signal Y offset from signal X by 90 degrees. This can be conveniently done with a two phase phase lock loop (PLL) which is known in the art.

Figure 3:
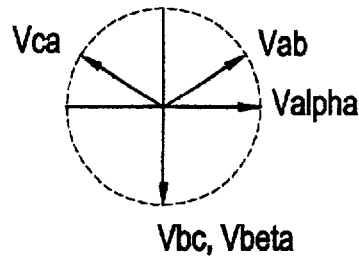
FIG. 3 shows a reference voltage phasor set of Vab, Vca, and Vbc with a given transformation of Vab and Vbc generator voltages that are later transformed into Valpha and Vbeta by vector rotation for later calculations.
Figure 5:
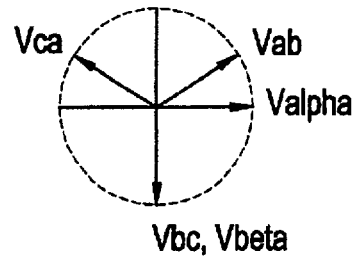
FIG. 5 shows a given transformation of Vab and Vbc as in FIG. 3.
Figure 4:
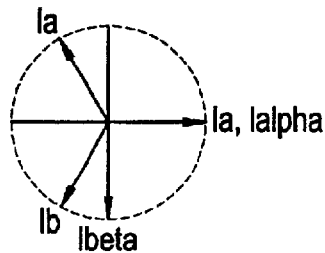
FIG. 4 shows a reference current phasor set of Ia, Ib, and Ic with a given transformation of Ia and Ic generator currents that are later transformed into Ialpha and Ibeta by vector rotation for later calculations.
Figure 6:
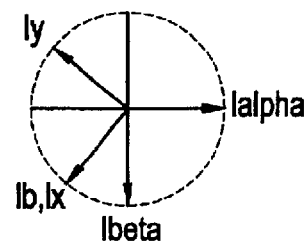
FIG. 6 shows a given transformation of Ib that is also Ix or signal X from a single phase CT and a derived Iy or signal Y.

FIGS. 3–12 show the use of device 10 in an excitation system (not shown) to calculate generator voltages and currents using various 3 phase and single phase inputs. The alpha and beta signals are derived from X and Y signals by vector rotation in subsequent calculations to calculate voltage magnitude, current magnitude, real power, reactive power, frequency, and the like. Signals X and Y are represented as Vx and Vy, respectively in the voltage phasor diagrams and as Ix and Iy, respectively in the current phasor diagrams. FIGS. 3 and 4 depict a reference phasor set having a transformation given of Vab, Vbc, Ia, and Ic. In this example, poly phase instrumentation is available for both voltage measurement and current measurement. In other words, a two phase signal set is output from the generator instrumentation for both voltage and current. FIGS. 5 and 6 depict mixed signal transducering with a 3 phase PT and a single phase CT. In FIGS. 5 and 6, the voltage transformation is the same as in FIG. 3, but FIG. 6 indicates a single phase current transformer CT generating a signal Ib, which equates to signal X depicted as Ix in FIG. 6. Iy is derived from Ix as described above using device 10. It will be seen that Iy lags Ix by 90 degrees. FIGS. 7–12 indicate signal phase transducering that result in poly phase signal sets for later derivation into the alpha and beta signal sets as shown. For instance, FIG. 7 indicates a given voltage transformation of Vab which equates to signal X or Vx as discussed above. Vy is generated with equivalent amplitude and out of phase by 90 degrees as shown from $V_x$. Similarly, FIG. 8 indicates a current transformation given of Ic, which is signal X or Ix as discussed above. Iy is generated as signal Y for later derivation of poly phase signal set Ix and Iy into Ialpha and I beta for subsequent calculations.

Figure 13:
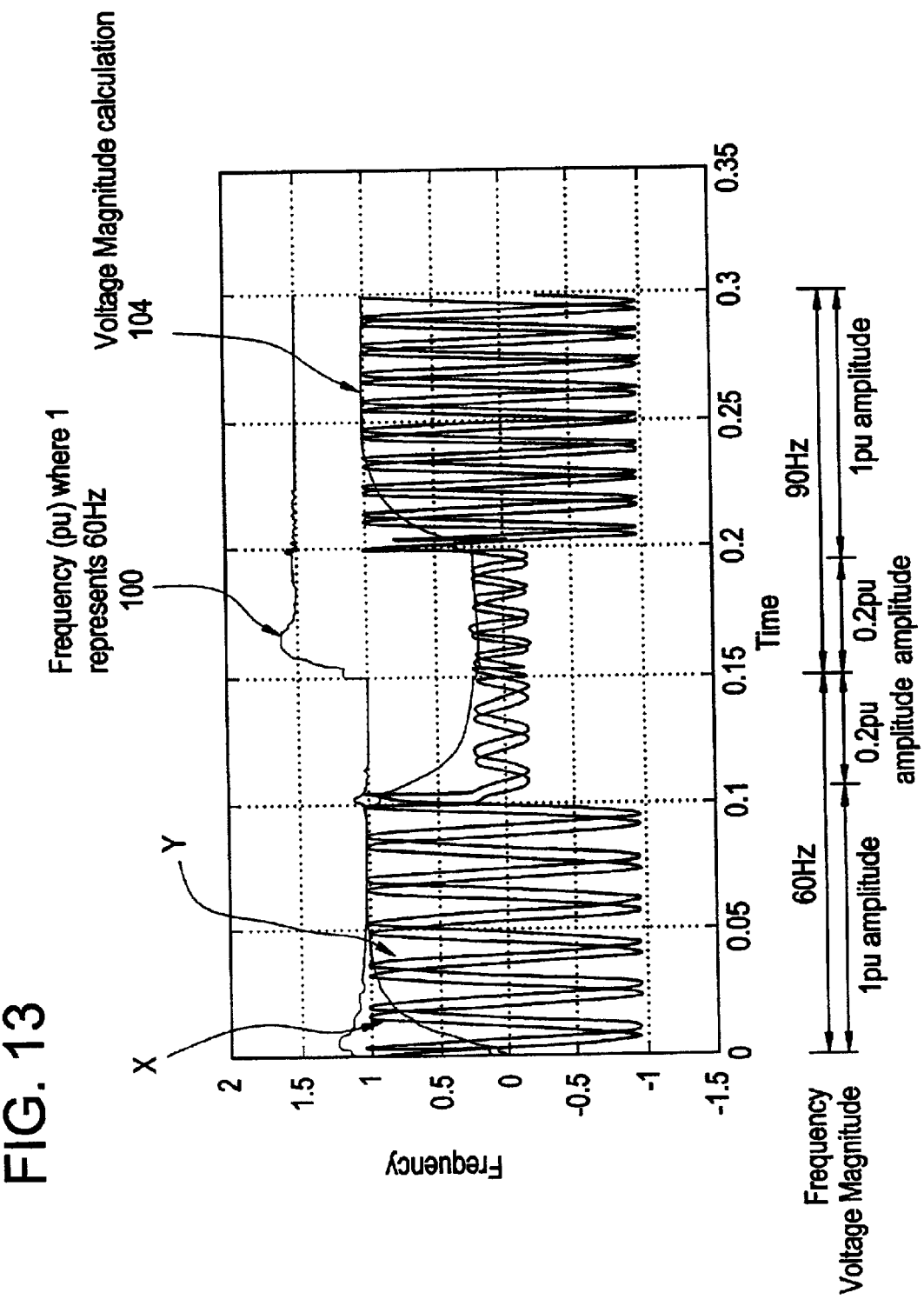
FIG. 13 shows a MATLAB simulation comparing the poly phase signals (X and Y) to calculate voltage magnitude and frequency thereof using existing measurement apparatus for poly phase signals.

Referring now to FIG. 13, a simulation using a MATLAB simulator is shown for the EX2100 instrumentation scheme. FIG. 13 shows the result of the complete measurement scheme including the use of a PLL and filters. Device 10 produces signals X and Y for downstream calculations of frequency voltage magnitude using a PLL and filters. Signal Y is offset from signal X and both signals have a frequency of 60 Hz as seen graphically with six periods of each signal occurring within 0.1 sec. A downstream calculation suite computes the frequency of the 60 Hz poly phase signal set X,Y and indicates this magnitude with a output frequency signal 100 having an amplitude of "1" representing 60 Hz. The downstream calculation suite also calculates the voltage magnitude of poly phase signal set X,Y and is indicated by voltage magnitude signal 104. It will be seen that at time=0.1 sec, the amplitude of signal set X an Y decrease reflecting a resulting decrease in the voltage magnitude signal 104, however, the frequency signal output 100 remains unchanged. At time=0.15, the frequency of signal set is increased and reflects a frequency output signal of 1.5 that defines 90 Hz (i.e., 60 Hz*1.5=90 Hz). At time=0.2 sec., the amplitude of signal set X and Y increases from 0.2 pu to 1.0 pu which is reflected in the voltage magnitude output signal 104.

The above method and apparatus is adaptable to varied signal sources and eliminates the need to have different and specific methods to calculate values generated from various sources, i.e., single phase and mixed 3-phase with single phase measurements. The above described method and apparatus also eliminates the need for substantial filtering usually associated with single-phase measurements used in downstream calculations to determine voltage, current, power magnitudes, and the like.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for performing poly phase instrumentation using a single signal output of a single phase instrument comprising:

generating a first signal output X representing the single signal output;

processing the single signal output to generate a time delayed version Y_Raw of the single signal output by a time delay T; and processing said time delayed version Y_Raw to compensate for frequency changes in the single signal output and generating a second signal output Y of the poly phase signal set, wherein said second signal output Y is displaced from said first signal output X by about 90 degrees.

2. The method of claim 1 wherein said time delay T includes about 0.25 times the nominal period of single signal output.

3. The method of claim 1 wherein said Y_Raw is generated by a digital delay.

4. The method of claim 1 wherein said digital delay processing of the single signal output includes the function X*e-sT, where s is the Laplace operator.

5. The method of claim 1 wherein dt is a sampling rate of a computer, processor, or the like.

6. The method of claim 1 wherein X and Y are sinusoidal signals approximately 90 degrees apart.

7. The method of claim 1 wherein the single phase instrument is one of a potential transformer and a current transformer.

8. The method of claim 1 wherein said processing said first signal X includes:

providing first signal X to a proportional path where first signal X is multiplied by cos($\omega$cu);

providing first signal X to a digital delay path where the first signal X is digitally delayed proximate to 0.25 times the nominal period of X;

summing the multiplied and delayed signals to generate a summed signal; and performing a division n integration of the summed signals to generate said second signal Y indicative of the amplitude and frequency of first signal X.

9. The method of claim 4 wherein said second signal output Y=(Y_Raw−cos($\omega$cu))/sin($\omega$cu), where ($\omega$cu)= 32*dt*Frequency of signal X*pi/2 radians/second and dt is a processing sampling time in seconds.

10. The method of claim 4 wherein said X and Y comprise a poly phase signal set, said poly phase signal set are inputs to a two phase lock loop (PLL), where Y is substantially of equal amplitude and frequency of X.

11. A device for performing poly phase instrumentation for generator control using a single signal output of a single phase instrument, the device comprising:

an I/O device configured to receive a first signal and generate said first signal as a first output;

a multiplier connected to receive said first signal and generate a multiplied cosine value signal of said first signal;

a digital delay connected to receive said first signal, said digital delay delaying said first signal to generate a delayed signal;

a summer connected to receive both the multiplied signal and the delayed signal, the summer generating a summation signal; and a divider connected to receive said summation signal and a sin value signal and perform a division of said summation signal and said sin value signal to generate a second output, wherein said first and second outputs represent two different phase signals.

12. The device of claim 11 wherein said first signal is derived from an electric generator.

13. The device of claim 11 wherein said first signal is a sinusoidal signal received from one of a single phase potential transformer and a single phase current transformer.

14. The device of claim 11 wherein said delayed signal includes said first signal delayed by a time delay T, said T is approximately 0.25 times the nominal period of single signal output.

15. The device of claim 11 wherein said digital delay includes a function X*e-sT, where s is the Laplace operator.

16. The device of claim 11 wherein said X and Y comprise a poly phase signal set, said poly phase signal set are inputs to a two phase lock loop (PLL), where Y is substantially of equal amplitude and frequency of X.

17. The device of claim 11 wherein X and Y are sinusoidal signals approximately 90 degrees apart.

18. The device of claim 11 wherein the single phase instrument is one of a potential transformer and a current transformer.

19. The device of claim 14 wherein a signal Y_Raw is generated by said digital delay.

20. The device of claim 19 wherein said second signal output Y=(Y_Raw−cos($\omega$cu))/sin($\omega$cu), where ($\omega$cu)= 32*dt*Frequency of signal X*pi/2 radians/second and dt is a processing sampling time in seconds.

21. The device of claim 20 wherein dt is a sampling rate of a computer, processor, or the like.

* * * * *